United States Patent
Knis et al.

(10) Patent No.: US 8,708,375 B2
(45) Date of Patent: Apr. 29, 2014

(54) PLUG CONNECTION

(75) Inventors: Wolfram Knis, Schwaebisch Gmuend (DE); Uwe Ehrhardt, Ostfildern (DE); Hans Albrecht, Waiblingen (DE); Tilman Miehle, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 69 days.

(21) Appl. No.: 13/389,953

(22) PCT Filed: Jun. 22, 2010

(86) PCT No.: PCT/EP2010/058772
§ 371 (c)(1),
(2), (4) Date: Feb. 10, 2012

(87) PCT Pub. No.: WO2011/018262
PCT Pub. Date: Feb. 17, 2011

(65) Prior Publication Data
US 2012/0168018 A1  Jul. 5, 2012

(30) Foreign Application Priority Data

Aug. 12, 2009 (DE) .......................... 10 2009 028 473

(51) Int. Cl.
*F16L 37/00* (2006.01)
(52) U.S. Cl.
USPC ................ 285/305; 285/81; 285/319; 29/453
(58) Field of Classification Search
USPC ........... 285/308, 309, 310, 314, 305, 319, 81, 285/82; 29/453
See application file for complete search history.

(56) References Cited

U.S. PATENT DOCUMENTS

| 4,730,856 | A  | * | 3/1988  | Washizu ........................ 285/319 |
| 4,875,711 | A  | * | 10/1989 | Watanabe ..................... 285/319 |
| 5,806,898 | A  | * | 9/1998  | Hollnagle ..................... 285/319 |
| 6,068,303 | A  | * | 5/2000  | Hollnagle ..................... 285/319 |
| 6,173,998 | B1 | * | 1/2001  | Bock ............................. 285/319 |
| 6,338,506 | B1 | * | 1/2002  | Kubota et al. ................ 285/319 |
| 7,810,848 | B2 | * | 10/2010 | Yoshino ........................ 285/319 |
| 7,874,595 | B2 | * | 1/2011  | Lechner et al. .............. 285/305 |
| 8,146,956 | B2 | * | 4/2012  | Chaupin ....................... 285/305 |
| 8,205,912 | B2 | * | 6/2012  | Takenaka et al. ............ 285/319 |
| 8,262,137 | B2 | * | 9/2012  | Okuno et al. ................ 285/314 |
| 8,267,431 | B2 | * | 9/2012  | Okuno et al. ................ 285/314 |
| 8,336,924 | B2 | * | 12/2012 | Ully et al. .................... 285/319 |

FOREIGN PATENT DOCUMENTS

| DE | 10 2006 061 952 A1 | 7/2008 |
| JP | 62-18492 U | 2/1987 |
| JP | 63-132193 U | 8/1988 |
| JP | 8-501378 A | 2/1996 |
| JP | 2002-349780 A | 12/2002 |
| JP | 2003-83492 A | 3/2003 |

* cited by examiner

*Primary Examiner* — David E Bochna
(74) *Attorney, Agent, or Firm* — Maginot, Moore & Beck (57) ABSTRACT

A plug connector for media-bearing lines has a plug body for connecting to an opening. At least one rib is provided on the plug body, the rib being retained in the opening in the assembly position of the plug body by a retaining clip adjustable on the plug body. An assembly force acts on the retaining clip, the clip being supported on at least one rib of the plug body, thereby displacing the plug body into the opening, and locking therein in an undercut.

15 Claims, 7 Drawing Sheets

PLUG CONNECTION

CROSS-REFERENCE TO RELATED APPLICATION

This application is a 35 USC 371 application of PCT/EP 2010/058772 filed on Jun. 22, 2010.

BACKGROUND OF THE INVENTION

1. Field of the Invention

The invention relates to a plug connector for media-bearing lines. The plug connector has a plug body for connecting to an opening.

2. Description of the Prior Art

German Patent Disclosure DE 199 15 695 A1 relates to an inlet element of plastic and a method for its production. A throttle body includes an inner primary portion of plastic as well as a secondary portion of plastic, which is formed cohesively with an outer circumference of the primary portion, as well as an icing-prevention tube, which is embedded in the secondary portion. The cylindrically configured primary portion, with an essentially uniform wall thickness, is formed in a first molding step, as a result of which there is less shrinkage and rejection. Hence the requisite roundness or circularity of an inner circumferential face of the primary portion is ensured. The secondary portion is formed in an ensuing, second molding step, so that an outer side of the primary portion is covered in order thereby to produce a throttle body having a desired geometry. The temperature of a portion of the molding tool, which points toward the inner circumferential surface of the primary portion, is set lower than the temperature of the other portion of the molding tool, as a result of which the inner circumferential face of the primary portion, where dimensional precision is critical, can be cooled sooner than the other portion, to prevent shrinkage. If different types of plastic material are used for forming the primary and secondary portions, the degree of freedom in terms of the choice of material is increased.

German Patent Disclosure DE 39 07 764 A1 has a fuel distributor for fuel injection systems of internal combustions as its subject. This fuel distributor for fuel injection systems, having at least one fuel injection valve with a valve holder, has a receiving bore for the fuel injection valve and an end flange surrounding the receiving bore. The fuel injection valve is supported on the end flange by means of a collar. For positional fixation of the fuel injection valve, the end flange of the valve holder and the collar of the fuel injection valve are embodied, independently of a plug hood that is still to be put on, as parts corresponding to one another of a bayonet mount. The plug hood is used as an additional locking means and for that purpose, with locking pegs, it engages the recesses, serving the purpose of locking and unlocking, in the bayonet mount in form-locking fashion.

German Patent Disclosure DE 102 40 130 A1 relates to a plug connector for media-carrying lines. A method is disclosed with which a plug connector can be produced that has at least one connection point. A sleevelike body is injection-molded from a first material. The sleevelike body obtained is placed in a further cavity. In the further cavity, a plug body of a second material is injection-molded. The sleevelike body placed in the further cavity forms the molding tool, in some regions, for the plug body.

German Patent Disclosure DE 10 2006 061 952 A1 discloses a plug connector for media-carrying lines. The plug connector serves in particular for securing in an opening of an injector body of a fuel injector with a plug body. At least one detent element is embodied on the plug body. The plug body includes a connection stub, and the at least one detent element, in a locking position of a retaining clip received displaceably on the plug body, is secured in the opening of the injector body.

ADVANTAGES AND SUMMARY OF THE INVENTION

According to the invention, in a plug connector, it is proposed that the capability of assembling a plug body in an opening be improved. With the provisions according to the invention, for instance when a low-pressure-side return of a fuel injector is connected by means of the plug connector, the assembly steps of placing the plug body on the fuel injector and the ensuing locking of the plug body in the opening be combined, thus precluding incorrect assembly. This is achieved by providing that in the plug connector proposed according to the invention, compulsory guidance takes place, and thus correct placement of the plug connector on a connection stub in the low-pressure region of a fuel injector is ensured. Any possible escape of fuel from incorrect assembly can be reliably avoided by means of the plug connector proposed according to the invention.

Advantageously, the provisions proposed according to the invention make it possible to shorten the assembly or cycle times in the assembly of a fuel injection system in internal combustion engines. The separate assembly steps, that is, the placement and subsequent locking of the plug body on a connection stub of a fuel injector, are combined in one motion as a result of the compulsory guidance. The introduction of force to enable the assembly takes place at only a single point, and the two assembly steps are automatically performed sequentially one after the other.

The provisions proposed according to the invention make it possible to further reduce the amount of space required, so that the freedoms in terms of assembling the plug connectors proposed according to the invention in an internal combustion engine are improved. Moreover, because of the provisions proposed according to the invention, the line course can be simplified and the connection of surrounding engine components or components of the fuel injection system can be improved.

By means of an especially advantageous central force introduction, assembly faces become superfluous and can be dispensed with entirely. Because of a reduction in the use of material, economy of material and an attendant cost reduction can be ensured.

The provisions proposed according to the invention are furthermore suitable for automated checking whether a return plug is correctly connected; this is done via a pin, to be provided centrally on the plug body, that plunges through the end face of the retaining clip, and the clip is movable relative to the plug body of the plug connector. If the return plug body is correctly assembled, the end face of the retaining clip is located in the same plane as lands that are integrally injection-molded laterally onto the plug body, so that correct assembly of the plug body as well as the correct position of the retaining clip in a locked point can be detected automatically or mechanically.

BRIEF DESCRIPTION OF THE DRAWINGS

The invention is described in further detail below in conjunction with the drawings. In the drawings.

DESCRIPTION OF THE PREFERRED EMBODIMENTS

Figure 1:
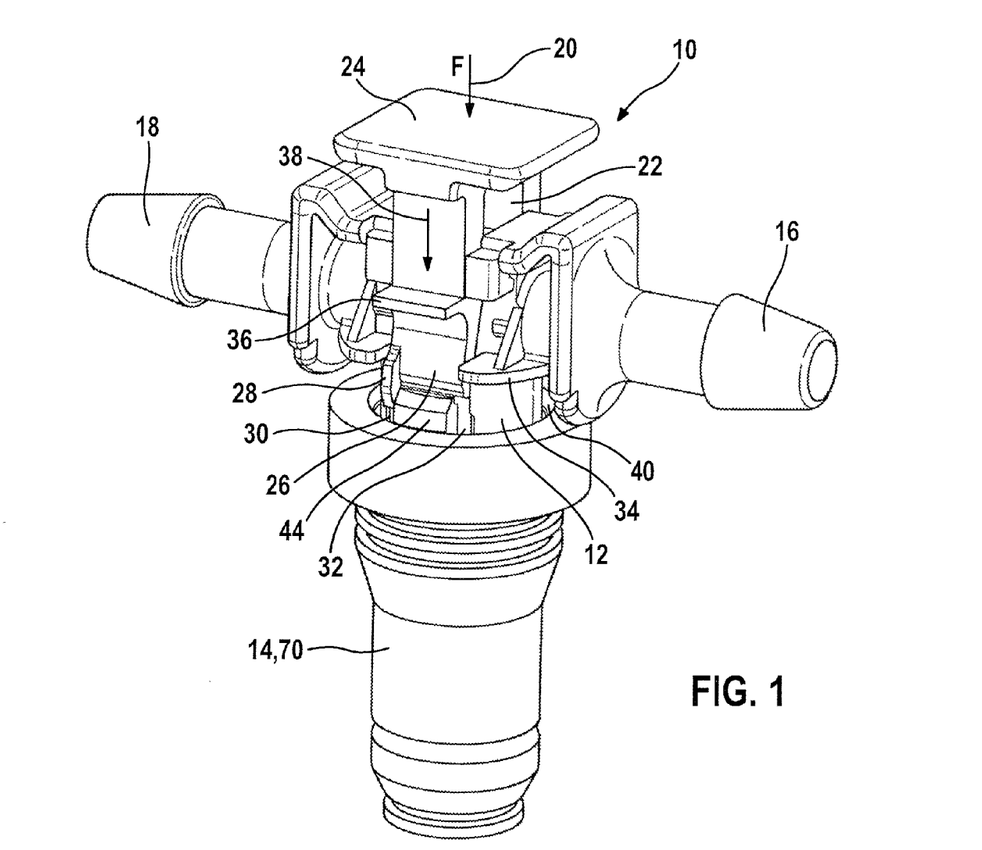
FIG. 1 shows the plug connector proposed according to the invention in the open position, before assembly on the low-pressure-side return of a fuel injector.

From the view in FIG. 1, it can be seen that a plug connector 10 includes both a plug body 12 and an injector stub 14 or a bushing 70. On the plug body 12, spaced apart by 180° or 120° from one another, are a first connection 16 and a second connection 18, which together form a horizontal conduit 52; see the views in FIGS. 2, 6, 7, 8 and 9.

FIG. 1 shows the plug connector proposed according to the invention, with a plug body, in the open position before assembly in an injector stub on the low-pressure side of a fuel injector.

From the view in FIG. 1, it can be seen that a plug connector 10 includes both a plug body 12 and an injector body 14 or a bushing 70. On the plug body 12, spaced apart by 180° or 120° from one another, are a first connection 16 and a second connection 18, which together form a horizontal conduit 52; see the views in FIGS. 2, 6, 7, 8 and 9.

An essentially vertically movable retaining clip 22 is received on the plug body 12. The retaining clip 22, preferably like the plug body 12 made as an injection-molded component, includes an end face 24. The end face 24 is engaged by an assembly force F, indicated by reference numeral 20, with which the retaining clip 22 is movable in the assembly direction 38.

The retaining clip 22 is disposed movably relative to the plug body 12. The retaining clip 22 includes detent hooks 26, for instance two of them, facing one another. The detent hooks 26 extend with a spread 64 on the retaining clip 22; see the views in FIGS. 2A and 2B.

On one of the detent hooks 26, there is a tonguelike positioning aid 28, which can be made directly by plastic injection casting in the production of the retaining clip 22. The positioning aid 28 is embodied such that it moves into a first slot 30 on the circumference of the plug body 12 in the vicinity of a rib 44. Next to the first slot 30, which extends essentially in the vertical direction on the plug body 12, a further, wider, second slot 32 is provided in the plug body 12, but it is not penetrated by a positioning aid 28. The second slot 32 is located between the jacket face of the plug body 12 and the other side face of the rib 44.

Also located on the retaining clip 22 having the two facing detent hooks 26 are support faces 36, with which the retaining clip 22, for locking the plug body 12, rests on an end face of an opening 40 of the injector stub 14 or of the bushing 70.

Figure 8:
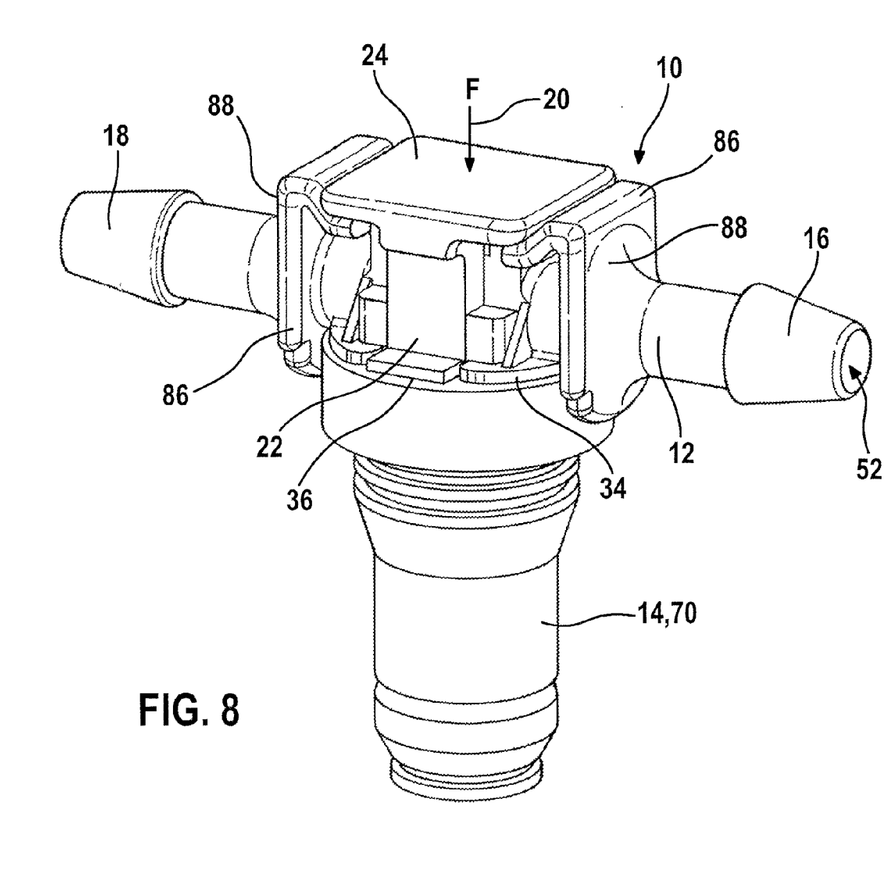
FIG. 8 shows the retaining clip, inserted into the injector stub, in the assembly position.
Figure 9:
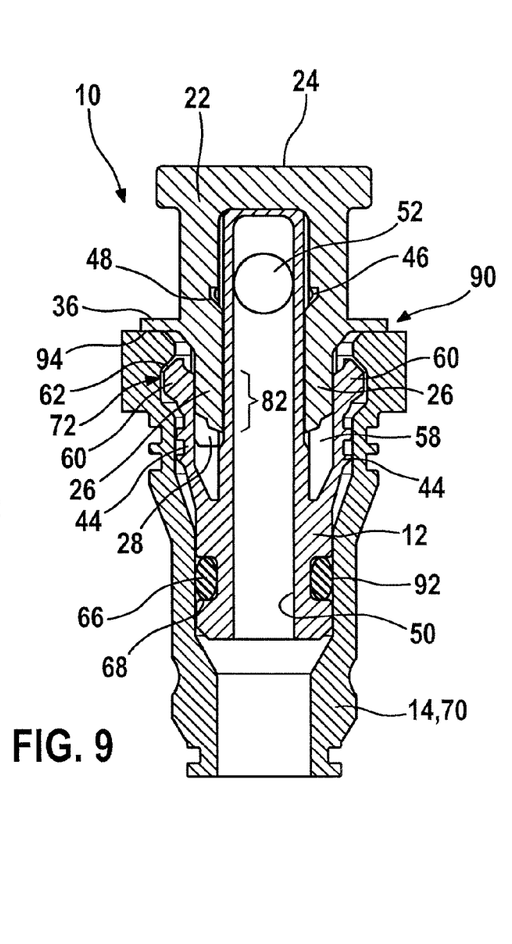
FIG. 9 shows the assembled state of the plug connector proposed according to the invention, in an outlet stub of a fuel injector, the stub being located in the low-pressure region.

The plug body 12 of the plug connector 10 proposed according to the invention furthermore has support faces 34, with which the plug body 12, in the state inserted into the opening 40, rests on the face end of the injector stub 14 that defines the opening 40, or on the end face of the bushing 70 (see FIGS. 8 and 9).

From the perspective view in FIG. 1, it can furthermore be seen that ribs 44 are embodied on the plug body 12, extending oppositely in the vertical direction to the detent hooks 26 of the retaining clip 22. The assembly direction 38 in which the plug connector 10 proposed according to the invention is assembled in the opening 40 is indicated by reference numeral 38.

Figure 1A:
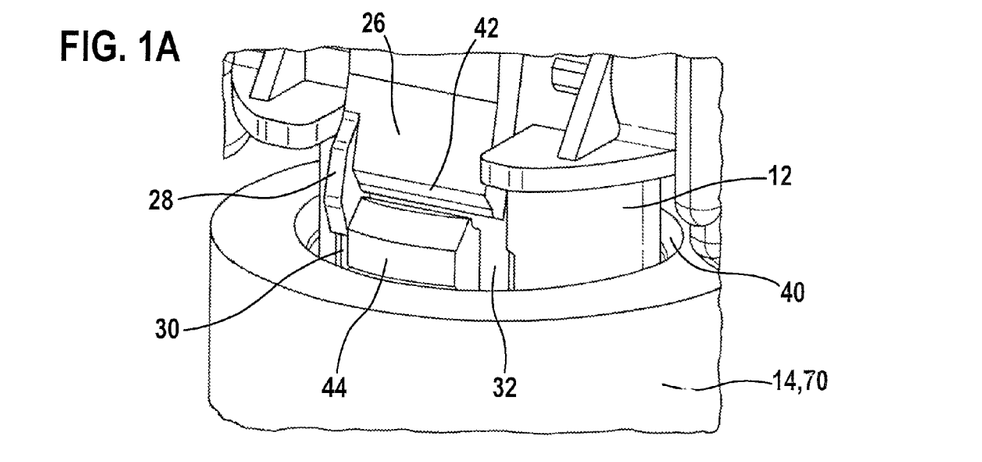
FIG. 1A is an enlarged view of the contact region between touch hooks of a retaining clip and ribs of a plug body of the plug connector.

FIG. 1A shows a view of the region where the detent hooks 26 of the retaining clip 22 contact the ribs 44. The ribs are integrally injection molded onto the jacket face of the plug body 12 of the plug connector 10 proposed according to the invention.

FIG. 1A shows that the positioning aid 28, integrally injection molded on a contact face 42 on the face end of the detent hook 26, is embodied in essentially tonguelike fashion. The tonguelike positioning aid 28, which prevents twisting of the retaining clip 22, protrudes into the first slot 30 between the jacket of the plug body 12 and a lateral boundary face of the rib 44. In the assembled state in FIG. 1A, the retaining clip 22, on which the detent hooks 26 are embodied, is in its open or in other words still unlocked position, and it can also be seen from the view in FIG. 1A that the contact face 42 is located at a distance, although slight, from the upper edge of the rib 44.

Figure 2:
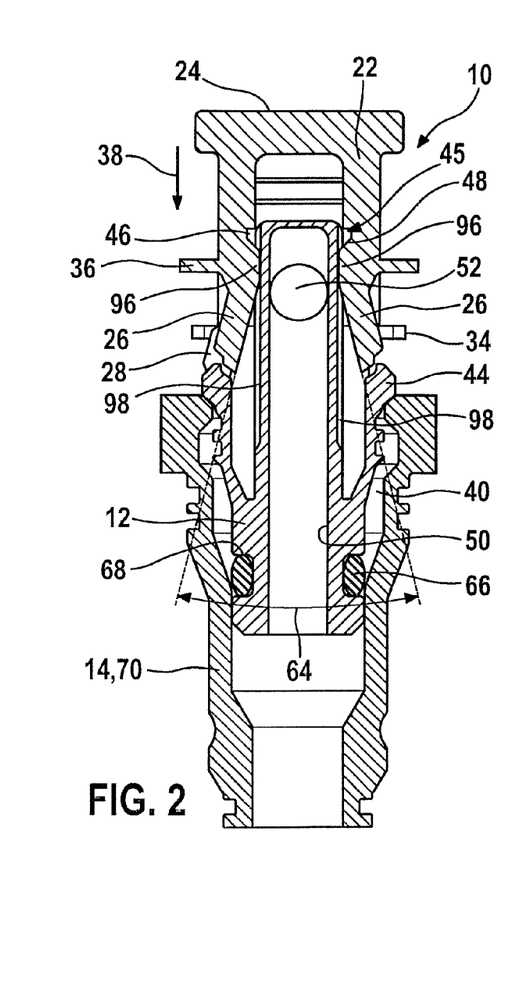
FIG. 2 shows the retaining clip on the plug body in the open position.

FIG. 2 shows a view of the plug connector proposed according to the invention, with a retaining clip that has stayed in the open position.

FIG. 2 shows that in the open position of the retaining clip 22, the retaining clip is locked with a groove 48 in a corresponding tongue 46 of the plug body 12 of the plug connector 10. The groove 48 and the tongue 46 form a restraint device 45 for the retaining clip 22. The detent hooks 26 of the retaining clip 22 extend with a spread—see reference numeral 64 in FIGS. 2A and 2B. It is can be seen from the view in FIG. 2 that the plug body 12 of the plug connector 10 proposed according to the invention is introduced into the opening 40 of the injector stub 14 or of the bushing 70. The ribs 44, extending oppositely to the detent hooks 26 of the retaining clip 22, are located on the jacket face of the cylindrically embodied plug body 12. The plug body 12 is preferably made in the course of the plastic injection-molding process, and besides the connections 16 and 18 and the horizontal conduit 52 formed by them, it has a vertically extending vertical conduit 50. Moreover, a recess 68, embodied as an encompassing groove, is located on the end of the plug body 12 pointing toward the opening 40, and a seal 66, embodied in particular as an O-ring, is let into this recess.

It can be seen from the view in FIG. 2 that because of the action of the restraint device 45, the detent hooks 26 of the retaining clip 22 are brought just far enough toward the top of the ribs 44 of the plug body 12 that the face ends of the detent hooks 26 and the face ends of the ribs 44 still just barely do not touch. Guide rails 96, embodied on the inside of the retaining clip 22, slide in recesses 98, embodied in complementary fashion to the profile of the guide rails, on the plug body 12 in order to prevent tilting of the retaining clip 22 during assembly. Reference numeral 36 indicates the support face on the retaining clip 22. Reference numeral 34 indicates a support face on the plug body 12, with which, in the assembled state, the plug body rests on the face end of the injector stub 14 or of the bushing 70. The plug body 12 is introduced into the opening 40 in the assembly direction 38. For locking the plug body 12 in the opening 40, the retaining clip 22 is displaced in the vertical direction. FIG. 2 also shows that the tongues 46 of the restraint device 45, in the open position of the retaining clip 22, are located on the plug body 12 on the lower end of grooves 48 in the retaining clip 22.

Figure 2A:
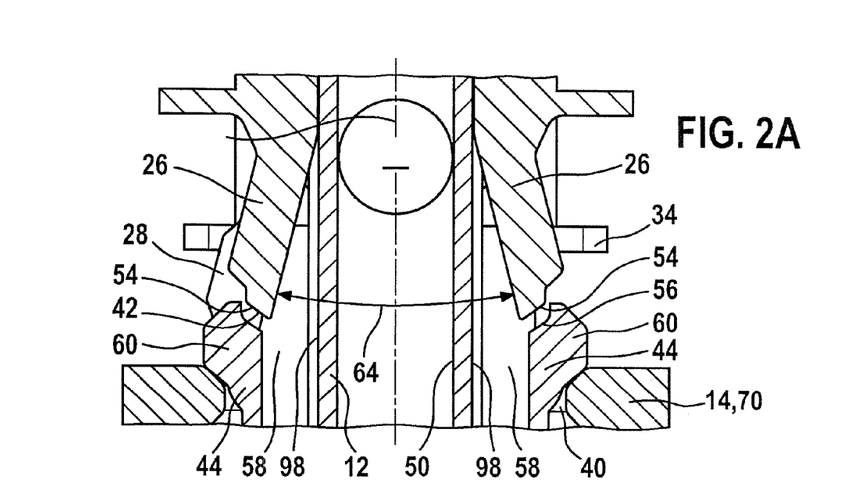
FIG. 2A is a view on a larger scale of the spread-apart detent hooks.

FIG. 2A, on a larger scale, shows a view of the end faces, facing one another, of both the detent hooks of the retaining clip and of the end face of the ribs of the plug body.

From FIG. 2A, it can be learned that the detent hooks 26 of the retaining clip 22, which is not shown in complete form here, are disposed with a spread 64 from one another. The spread can be in the range between 0° and 30°, depending on the dimensions. From the larger-scale view in FIG. 2A, it can be seen that the detent hooks 26, on one end toward a head 60 of the ribs 44, have a contoured face end 54. In complementary fashion to the contouring of the contoured face end 54 of the detent hooks 26, the face ends 56 of the heads 60 of the ribs 44 are also provided with contouring. From the view in FIG. 2A, it can be seen that the tonguelike positioning aid 28 is indicated, located behind the left detent hook 26. In FIG. 2A, reference numeral 58 indicates vertically extending recesses of the slots by which the resiliently embodied ribs 44 are movable relative to the jacket face of the plug body 12. Because of the contoured face ends 54 and 56 of the detent hooks 26 and of the heads 60 of the ribs 44, a reduction in the spread 64 of the detent hooks 26 of the retaining clip 22 is achieved upon contact of the face ends 54, 56 with one another. The detent hooks 26 are bent in the direction of the axis 74. With guide rails 96 shown in FIG. 2, the retaining clip 22 is slid on the plug body 12 in counterpart elements embodied as recesses 98, shaped in complementary fashion to the profile of the guide rails, in order to prevent tilting of the retaining clip 22 during its assembly or during the execution of the closing operation.

Figure 2B:
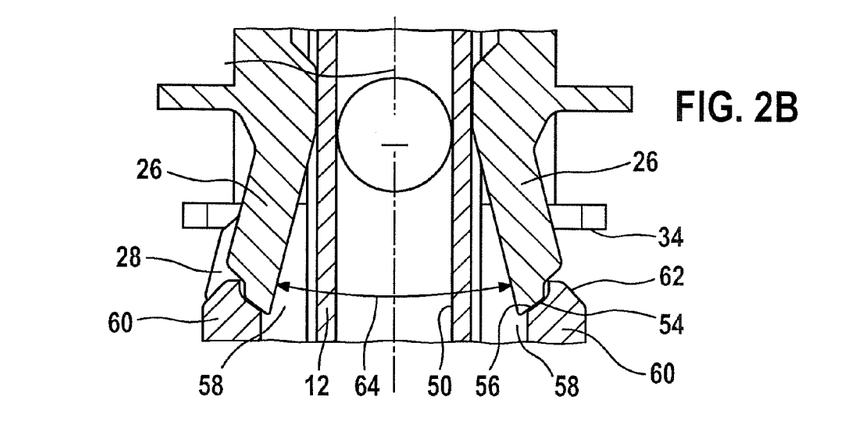
FIG. 2B is a detail showing contoured contact faces of detent hooks and of ribs of the plug body.

FIG. 2B shows the contoured face ends 54 and 56, contacting one another, of the detent hooks 26 of the retaining clip 22 and of the heads 60 of the ribs 44. The contoured face ends 54 and 56 are embodied with chamfers 62 extending radially inward, so that the introduction of the detent hooks 26 into the essentially vertically extending recesses 58 or slots 58 of the plug body 12 is simplified, and an introduction of the detent hooks 26 of the retaining clip 22 into the recesses 58 or slots 58 ensues in compulsory fashion with the exertion of the assembly force 20 on the face end 24 of the retaining clip 22 (see FIG. 2).

From the view in FIG. 2B, it can be seen that the heads 60 of the ribs 44 have the chamfer 62 on their outside. The chamfer 62, here embodied as a bevel, can also be embodied as a rounded area and serves to simplify the disassembly of the rib heads 60 from an undercut 72, embodied in complementary fashion to the geometry of the rib heads, in the injector stub 14 or in the bushing 70.

Figure 3:
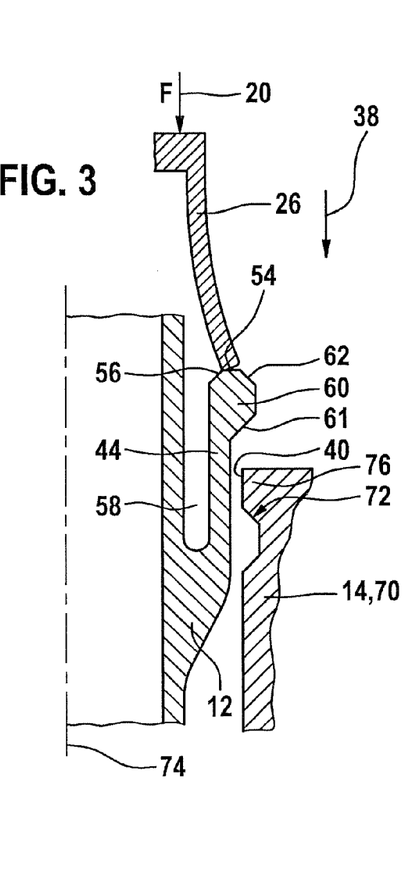
FIG. 3 shows the plug body, introduced into the opening of a bushing, but not yet locked.

From the view in FIG. 3, the plug body—shown schematically here—can be seen in a position inserted partway into the opening.

When the assembly force 20 (see F in FIG. 1) is exerted on the retaining clip 22, the detent hooks 26 embodied on it, and for instance disposed facing one another, exert an inward insertion face on the heads 60 of the ribs 44 of the plug body 12. As a result, the plug body 12 is inserted into the opening 40 in the injector stub 14 or bushing 70. On the inside of the boundary wall of the opening 40 of the injector stub 14 or bushing 70 is the undercut 72, which is embodied as complementary to the external geometry of the heads 60 of the ribs 44. On the injector stub 14 or bushing 70, a radially inward-protruding encompassing protrusion 76 extends above the undercut 72. Reference numeral 74 indicates the axis of symmetry of the plug body 12 of the plug connector 10 proposed according to the invention. From FIG. 3, it can be seen that the essentially vertically oriented recess 58 or a slot 58 extends between the jacket face of the plug body 12 and the inside of the rib 44 and lends the rib 44 elasticity in the radial direction.

Figure 4:
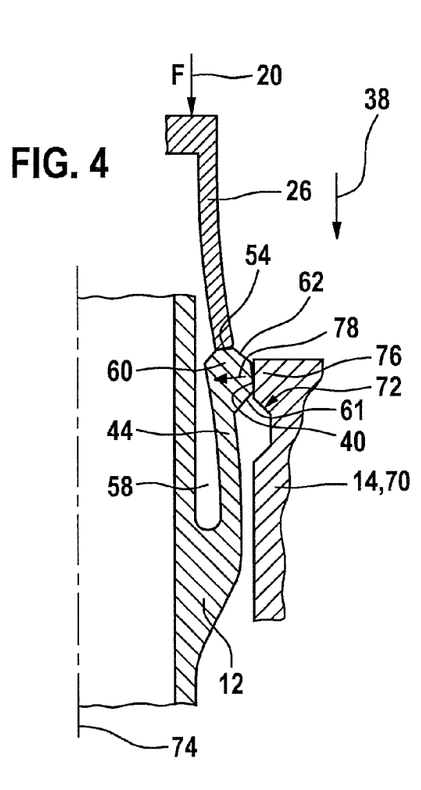
FIG. 4 is a view of the ribs of the plug body, subjected to the assembly force before the rib heads snap into a recess of the bushing.

FIG. 4 shows that upon insertion of the plug body 12 into the opening 40 of the injector stub 14 or bushing 70, or in other words when the assembly force 20 is maintained, a radially inward deflection of the head 60 of the rib 44 takes place, in accordance with the arrow marked by reference numeral 78. The elasticity of the rib 44, upon contact between the rib head 60 and the protrusion 76, causes the rib head 60 to be deflected radially inward and on being inserted farther inward it latches in the direction of [or "onto"—but that doesn't make sense] the undercut 72 extending on the inside of the bushing 70 or the injector stub 14. This state is shown in detail in FIG. 5. In the view in FIG. 4, the external geometry of the rib head 60, when the assembly force 20 is maintained, slips in the assembly direction 38 along the protrusion 76 until the head 60 of the rib 44, because of the intrinsic elasticity of the rib 44, snaps into the undercut 72, and the plug body 12 is thus fixed relative to the injector stub 14 or the bushing 70.

Figure 5:
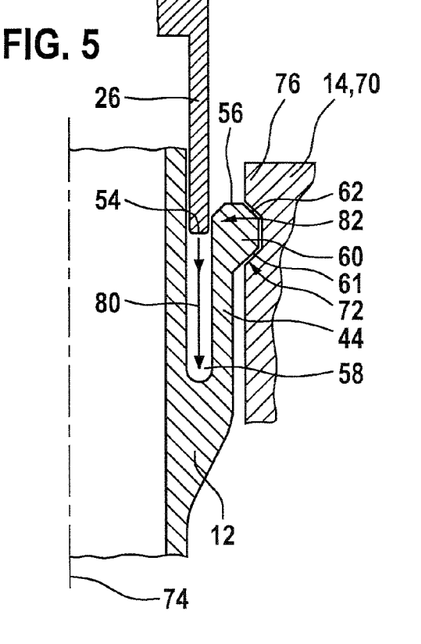
FIG. 5 shows the heads of the ribs, latched in a recess, extending in the circumferential direction, of the bushing.

FIG. 5 shows that because of the geometry of the contoured face end 54 and 56 (see FIGS. 2A, 2B) of the detent hooks 26 and ribs 44, respectively, on the plug body 12, the detent hooks 26 are deflected radially inward counter to the spread 64, corresponding to an inward insertion distance 80, they move into the recesses 58 between the jacket face of the plug body 12 and the ribs 44. In the state shown in FIG. 5, an overlap 82 of the contoured face ends 54 of the detent hooks 26 by the head 60 of the ribs 44 occurs. The overlap 82 moreover, because of the thickness of the material of the detent hooks 26, causes the head 60 of the radially elastically embodied rib 44 to remain fixed inside the undercut 72 of the bushing 70 or injector stub 14. The detent hooks 26 of the retaining clip 22 can plunge either partway or completely into the recesses 58 between the inside of the rib 44 and the jacket face of the plug body 12. If the detent hooks 26 plunge only partway inward, then even if dirt accumulates in the recesses 58, secure locking of the retaining clip 22 can still be achieved. This is all the more true if the detent hooks 26 have plunged all the way into the recesses 58.

Figure 6:
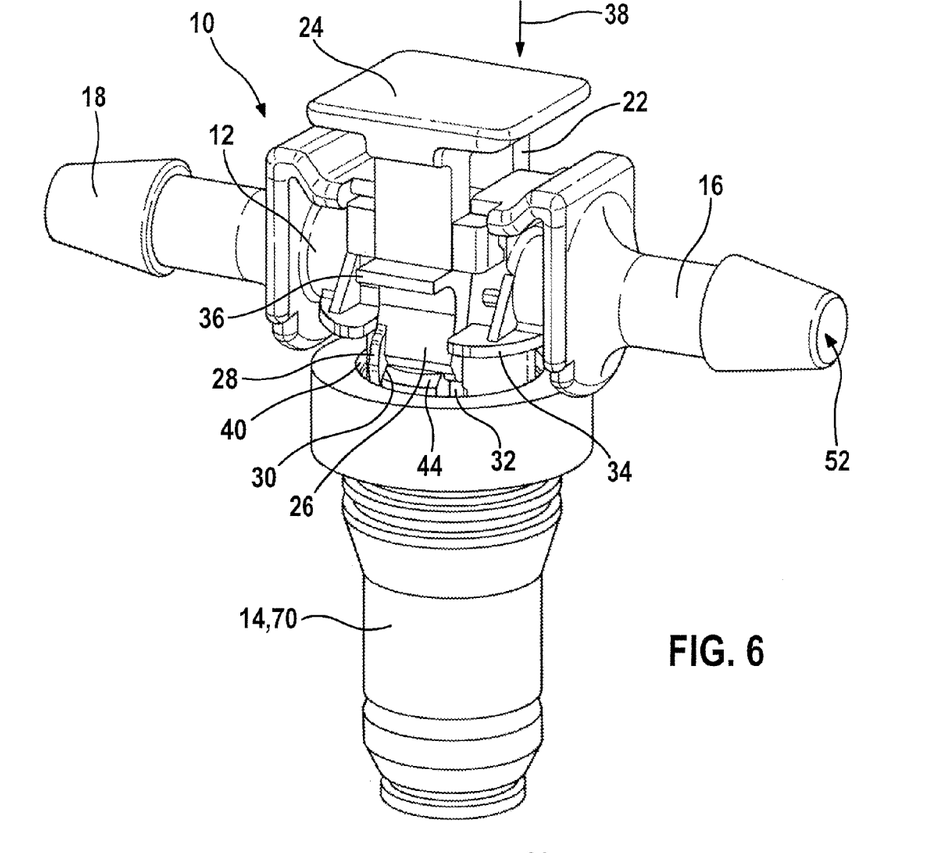
FIG. 6 shows a plug body of a return plug, the plug body having been inserted farther into an injector outlet stub.
Figure 6A:
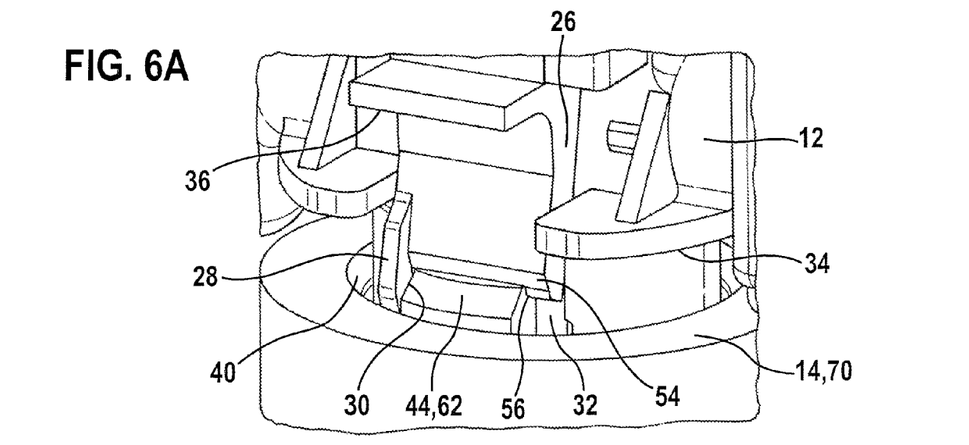
FIG. 6A is a detail view of the contoured face ends, contacting one another, of ribs of the plug body and of detent hooks of the retaining clip.

From FIGS. 6 and 6A, the plug connector proposed according to the invention can be seen in the state in which the face ends, provided with a contour, of the detent hooks of the retaining clip just barely do contact the face ends, opposite them and contoured in complementary fashion to them, of the ribs of the plug body.

FIG. 6 shows that upon a motion of the retaining clip 22 in the assembly direction 38, by the exertion of an assembly force F on the face end 24, the detent hooks 26 rest with their face ends on the face ends of the ribs 44 on the circumference of the plug body 12. The first connection 16 and the second connection 18 can be seen on the plug body 12, facing one another—in this case with a 180° spacing apart from one another. They form the horizontal conduit 52 extending through the plug body 12. The support face, which limits the maximum inward insertion distance of the retaining clip 22, which is supported displaceably on the plug body 12, is indicated by reference numeral 36. The further support face 34 is embodied fixedly on the plug body 12, and with it the plug body 12 in the assembled state rests on the periphery of the opening 40 of the injector stub 14 or bushing 70. From the view in FIG. 6, it can be seen that on the detent hook 26 located in the plane of the drawing, the tonguelike positioning aid 28 has moved into the first slot 30 next to the rib 44, while the further, second, slotlike recess 32 remains open. Because of the two recesses 30 and 32, which extend essentially vertically next to the rib 44, the rib 44 acts as a cradle.

From FIG. 6A, it can be seen that in this enlarged view, the contoured face end 54 of the detent hook 26 rests on the complementary contoured face end 56 of the rib 44. Because of the oriented contour, that is, a chamfer inward toward the plug body 12, when an assembly force is applied to the retaining clip 22 in the assembly direction 38, it is attained that the contoured face ends 54 of the detent hooks 26 slide away inward and move into the slotlike recesses 58 (FIGS. 3-5). From the enlarged view in FIG. 6A, it can be seen that the tonguelike positioning aid 28 has moved into the first slot 30. Also from the enlarged view in FIG. 6A, it can be seen that the rib 44 has the chamfer 62, which in the assembled state of the retaining clip 22 acts as its bracing face to prevent it from slipping out of the undercut 72.

Figure 7:
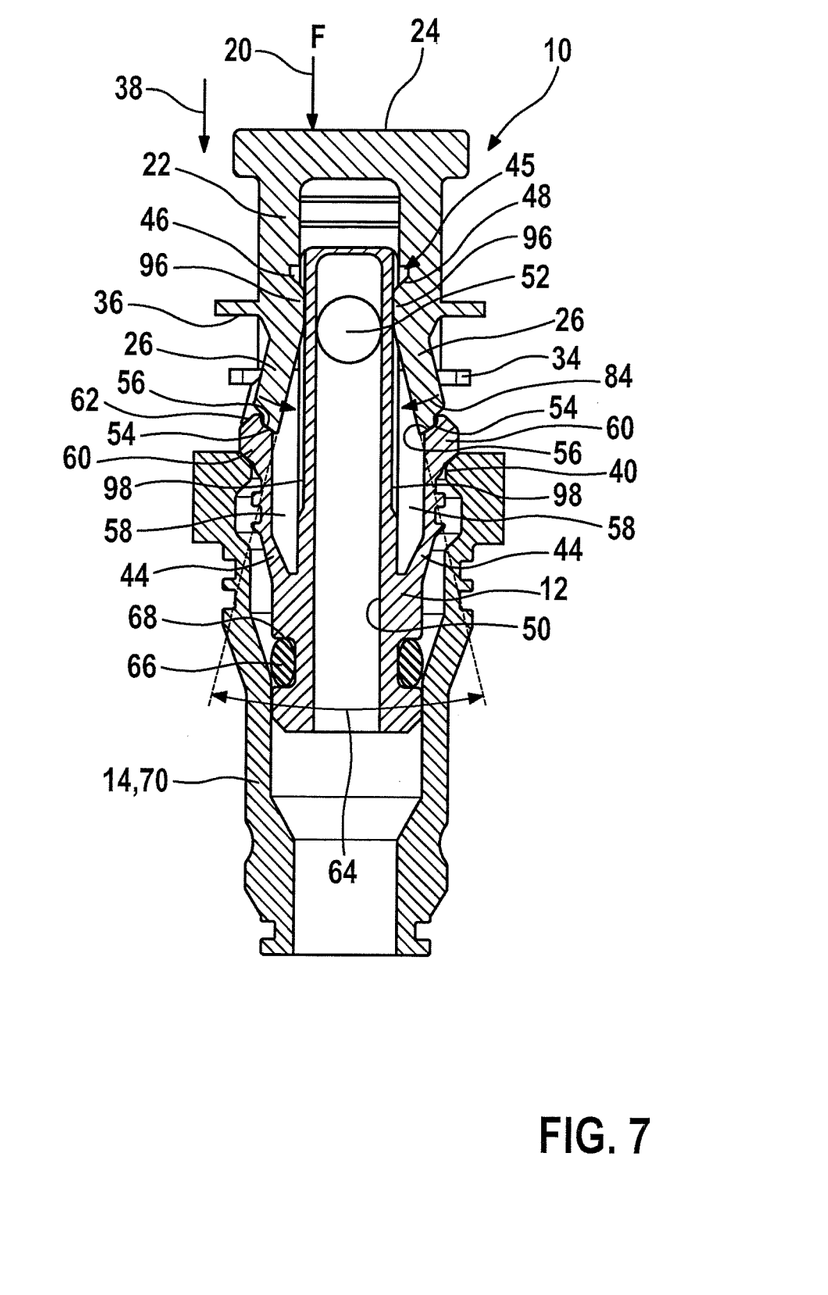
FIG. 7 shows the radially inward sliding of the contoured face ends of the detent hooks away from the heads of the ribs of the plug body.

FIG. 7 shows the retaining clip, received displaceably on the plug body, in its open position.

From the view in FIG. 7, it can be seen that the plug body 12 has been let at least partway into the opening 40 of the injector stub 14 or bushing 70, but the retaining clip 22 is not yet locked. In the open position, shown in FIG. 7, of the retaining clip 22, the retaining clip is locked on the plug body 12 in its open position by a tongue-and-groove arrangement 46, 48 that forms the restraint device 45. In the open position of the retaining clip 22, the contoured face ends 54 of the detent hooks 26 just touch the contoured face ends 56 of the ribs 44, or heads 60 of the ribs, facing them. If the assembly force 20 acts on the end face 24 of the retaining clip 22, then on the one hand the plug body 12 can be inserted into the opening 40 until the heads 60 of the ribs 44 rest on the periphery of the opening 40 in the injector stub 14 of the bushing 70.

Correct guidance of the retaining clip 22 on the plug body 12 is attained by means of the positioning aid 28, which in the present exemplary embodiment is embodied in tonguelike fashion. From the view in FIG. 7, it is seen that in the open position of the retaining clip 22 on the plug body 12, the two, detent hooks 26 have the spread 64. The spread 64 has the effect that the contoured face ends 54 rest precisely on contours of the face ends 56, contoured in complementary fashion to them, on the top of the heads 60 of the ribs 44, and the spread, indicated by reference numeral 64, radially inward of the detent hooks 26 on the one hand and of the rib heads 60 on the other is possible.

From FIG. 7 it can be seen that in complementary fashion to the geometry of the detent hooks 26 of the retaining clip 22, the ribs 44 are disposed facing one another on the plug body 12, and the vertically oriented slotlike recesses 58 are provided between the inside of the ribs 44 and the jacket face of the plug body 12.

Reference numeral 50 indicates the vertical conduit extending through the plug body 12, while reference numeral 52 indicates the horizontal conduit, which merges with the first connection 16 and the second connection 18 of the plug body 12 as shown in FIG. 6.

In the open position in FIG. 7, it can be seen that the support face 36 of the retaining clip 22 and the support face 34 of the plug body 12 are located in two different planes. In the assembly position, shown in FIGS. 8 and 9, of the plug connector 10 proposed according to the invention, the two support faces 34 and 36 are located in the same plane.

The assembly of the retaining clip 22 and of the plug body 12 in the opening 40 of the injector stub 14 or the bushing 70 takes place based on the view in FIG. 7. They are inserted together into the opening 40. As seen from FIG. 7 (see also FIGS. 3, 4 and 5), the detent hooks 26 of the retaining clip 22 rest with their contoured face ends on the rib heads 60, and in particular on the contoured face ends 56 of the rib heads 60. If the rib heads are seated with their chamfers 62 on the plane face of the periphery of the opening 40, and the assembly force 20 continues to be exerted on the end face 24 of the retaining clip 22, then (see FIGS. 4 and 7) a deflection of the detent hooks 26 of the retaining clip 22 takes place inward in the deflection direction 84, so that the contoured face ends 54 of the detent hooks 26 slide radially inward away from the rib heads 60. The contoured face ends 54 of the detent hooks 26 thus enter the slotlike recesses 58 extending in the vertical direction. The guide rails 96, guided in the counterpart elements embodied as recesses 98, on the inside of the detent hooks 26 of the retaining clip 22, together with the positioning aid 28, prevent tilting of the retaining clip 22 during the assembly and in the closing operation thereof. In the closing operation of the retaining clip 22, the grooves 48 are moved relative to the tongues 46 of the restraint device 45 of the plug body 12, until the retaining clip 22 rests with its support face 36 on the periphery of the opening 40.

FIGS. 8 and 9 show that in this state, the detent hooks 26 force the rib heads 60 with their outer contour into the undercut 72 of the injector stub 14 or the bushing 70. The result is the overlap 82, with which the inside of the rib heads 60 cover the tips of the detent hooks 26, so that the plug body 12, in the assembly position, as seen in FIGS. 8 and 9, is received in captive fashion and locked in the injector stub 14 or bushing 70.

Unlike the situation in FIG. 6, from FIGS. 8 and 9 it can be seen that when assembly is complete and correct, the support face 34 of the plug body 12 is flush with the support face 36 of the retaining clip 22, in the assembly position 90 of the plug connector 10 proposed according to the invention. Both faces 34 and 36 rest on the periphery of the opening 40, in particular on the injector stub 14 or the bushing 70. From FIG. 8, it can also be seen that lands 86 which have the hose support faces 88 are embodied on the plug body 12. The hoses, for instance of a return system of a fuel injection system, are inserted onto the chamfered connections 16 and 18 and are widened by the cone and are thus secured to the connections 16, 18. The hoses are slipped axially on until the face ends of the hoses touch the hose support faces 88 of the lands 86 of the plug body 12. FIG. 8 shows that when the plug connector 10 is correctly assembled, the end face 24 of the retaining clip 22 is located in the same plane as the lands 86 of the plug body 12. In the end face 24, there is a bore, and on one of the lands 86 there is a pin that can plunge into the bore in the end face 24. This has not been shown in the drawing. Because it is provided, it is possible to detect the flush location of the end face 24 in comparison to the lands 86, and thus the correct assembly position of the plug connector and of the retaining clip 22 can be checked in automated fashion or mechanically.

From FIG. 9 it can be seen that in the assembly position 90, there is a support 94 between the support face 36 of the retaining clip 22 and the periphery of the opening 40. Reference numeral 92 indicates a sealing point in which the deformed seal 66 contacts the inside of the opening 40 in the injector stub 14 or bushing 70 and seals it off from the escape of a medium, such as fuel.

The position in which the support face 36 is integrally injection-molded onto the outer circumference of the retaining clip 22 determines the maximum inward insertion distance by which the detent hooks 26 of the retaining clip 22 can be inserted into the essentially slotlike recesses 58 between the inside of the ribs 44 and the circumferential surface of the plug body 12.

The plug connector 10 proposed according to the invention, which is described above in terms of one exemplary embodiment shown in FIGS. 1 through 9, has the assembly function, and the plug connector 10 is designed in particular to be capable of being removed. Easier dismantling is possible because of the chamfers 62. The flexibly embodied detent hooks 26 secure the plug body 12 against coming loose from the injector stub 14 or the bushing 70. The sealing function of the sealing point 92 is taken on by the sealing ring of the seal 66. The retaining clip 22 prevents the ribs 44 from snapping backward and thus increases the force that is required to remove the plug body 12 from the injector stub 14 or bushing 70.

In FIGS. 6 and 7, the retaining clip 22 is latched by the restraint device 45 in an open position, in which the retaining clip does not hinder the bending of the detent hooks 26 and does not block them. In the open position, the unit, that is, the plug connector 10 and plug body 12, retaining clip 22 and seal 66, is assembled in the opening 40 of the injector stub 14 or bushing 70. The lower limit of the assembly force 20 is determined on the basis of the compressive force required for compressing the sealing ring of the seal 66. The upper limit of the assembly force 20 is determined from the lower limit of the force needed to release the retaining clip 20 on the plug body 12. The retaining clip 22 is disposed displaceably on the plug body 12. When the assembly force 20 is exerted, the ribs 44 of the plug body 12 are elastically deformed and latch into the undercut 72 of the injector stub 14 or bushing 70 and thus lock the plug body 12 in the opening 40. This means that the assembly force 20 must be at least great enough to cause the deformation of the ribs 44. The detent hooks 26 embodied as cradles are introduced in compulsory fashion into the undercut 72 by the geometry of the opening 40.

Upon further exertion of the assembly force 20 in the assembly direction 38, the retaining clip 22 is displaced on the plug body 12 such that it fits over the detent hooks 26 of the retaining clip having the rib heads 44—see position 82 in FIG. 5—so that the rib heads 60 are secured by the undercut 72. The retaining clip 22 latches in assembly position 90 in such a way that it is impossible to release the retaining clip 22 without exerting force.

The assembly is effected via the force introduction 20 oriented in the assembly direction 38; only the amount of this force varies over the course of the assembly motion. The plug body 12 with the retaining clip 22 received on it is inserted into the opening 40. The transfer of force from the retaining clip 22 to the plug body 12 can be either force-locking or form-locking, or a combination of the two. In a force-locking connection between the plug body 12 and the retaining clip 22, interfering geometries, such as of the restraint device 45, which can be elastically deformed via the introduction of force, are moved relative to one another. The design of the restraint device 45 is done taking friction into account; the assembly force 20 and the sealing force are adapted to one another.

When the plug connector 10 is correctly assembled, for instance on a fuel injector—see FIGS. 8 and 9—and after closure of the retaining clip 22, the end face 24 of the retaining clip 22 is located in the same plane as the two lateral lands 86 that form hose support faces 88. This position can be monitored by means of an automated or mechanical check in the course of mass production. A further visual characteristic for ascertaining the correct assembly of the plug connector 10 proposed according to the invention resides in the fact that the lands 86 are injected in a different color, such as black, while the retaining clip 22 itself is made in a color that contrasts with them. Both the plug body 12 and the retaining clip 22 received displaceably on it are preferably manufactured in the course of the plastic injection-molding process.

Figure 10:
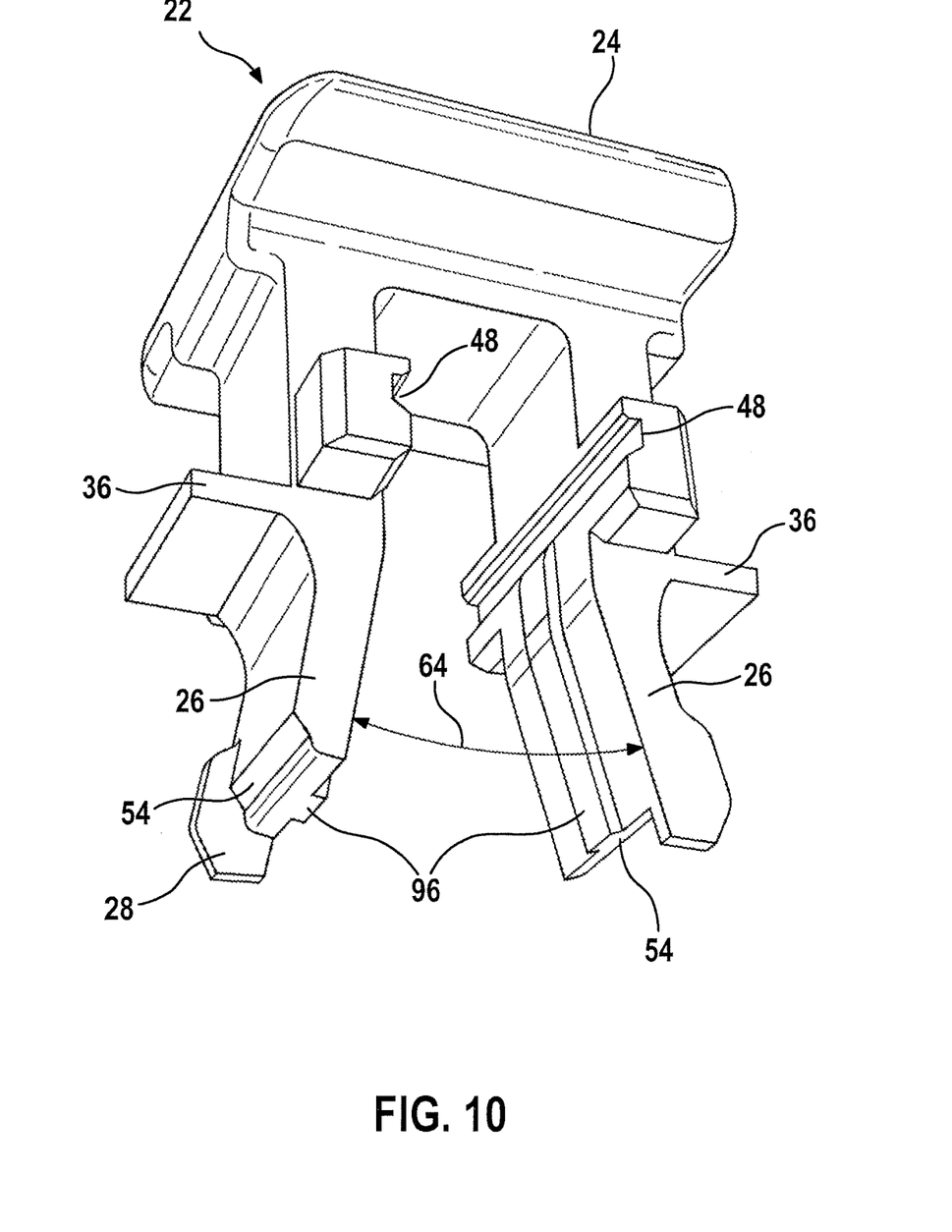
FIG. 10 is a perspective view of the retaining clip.

FIG. 10 shows a perspective view of the retaining clip.

From the view in FIG. 10, it can be seen that the retaining clip 22 has the two detent hooks 26 below the end face 24. The support faces 36 of the retaining clip 22 are located on the outsides of the respective detent hooks. The insides of the detent hooks 26, embodied facing one another and with the spread 64 relative to one another, are provided with the guide rail 96. The guide rail 96 can be embodied for instance as a semi-symmetrically or rectangularly or triangularly configured protuberance on the insides of the detent hooks 26. The guide rails 96 on the inside of the detent hooks 26 that face one another move in counterpart elements embodied as recesses 98, embodied in complementary fashion to the profiling of the guide rail 96, on the outside of the plug body 12, as shown in conjunction with FIGS. 2, 2A and 7. By the motion of the retaining clip 22 along the recesses 98—the guide rails 96 are guided on the inside of the detent hooks 26 during assembly and in the closing operation of the retaining clip 22, to prevent tilting of the retaining clip 22 during its motion relative to the plug body 12. It is understood that it is also possible to mount the guide rails 96 on the outside of the plug body 12, instead of on the inside of the detent hooks 26, to embody the recesses 98 on the inside of the detent hooks 26 instead of on the outside of the plug body 12. The grooves 48 for securing the retaining clip 22 in its closing position extend above the guide rails 96, rotated by 90° to the orientation of the guide rails.

From the view in FIG. 10, it is also seen that the essentially tonguelike positioning aids 28 are disposed on the ends of the detent hooks 26, or in other words in the vicinity of the profiled end faces 54 on both detent hooks 26. These positioning aids are embodied offset from one another, or in other words on different face ends of the detent hooks 26, but they can also be embodied on facing ends of the detent hooks 26.

The foregoing relates to the preferred exemplary embodiments of the invention, it being understood that other variants and embodiments thereof are possible within the spirit and scope of the invention, the latter being defined by the appended claims.

The invention claimed is:

1. A plug connector for media-carrying lines, comprising:
   a plug body configured to connect to an opening and having at least one rib formed on the plug body; and
   a retaining clip supported axially adjustably on the plug body and which includes a plurality of detent hooks, each of which has a contoured face end,
   wherein, in an assembly position of the plug body, the plurality of detent hooks are braced on the at least one rib to secure the at least one rib, wherein an assembly force acts on the retaining clip to move the plug body into the opening and lock the at least one rib in an undercut in the opening, and wherein the contoured face ends are configured to slide off from the at least one rib of the plug connector in a radially inward direction after the rib locks in the undercut.

2. The plug connector as defined by claim 1, wherein the plurality of detent hooks are disposed on the retaining clip at spaced apart by a pitch of 180°, or 120°, or 90°.

3. The plug connector as defined by claim 1, wherein each detent hook of the plurality of hooks each includes a positioning aid.

4. The plug connector as defined by claim 3, wherein the positioning aid includes a tongue configured to plunge into a slotlike recess of the plug body.

5. The plug connector as defined by claim 1, wherein:
the at least one rib is disposed on a circumference of the plug body and is embodied as a cradle having a rib head at an outer axial end of the cradle, and
a radially outer contour of the rib head is complementary to a contour of the undercut.

6. The plug connector as defined by claim 5, wherein the rib head of the at least one rib includes a contoured rib face end which is complementary to the contoured face ends of the plurality of detent hooks to facilitate the sliding of the plurality of detent hooks.

7. The plug connector as defined by claim 6, wherein a vertically extending recess is defined between the at least one rib and a circumference of the plug body.

8. The plug connector as defined by claim 7, wherein in a locked state of the plug body, the plurality of detent hooks protrude at least partway into the recess, and the rib heads of the ribs fit over the plurality of detent hooks and penetrate into the undercut.

9. The plug connector as defined by claim 1, wherein retaining clip is kept in an open position by a restraint device on the plug body.

10. The plug connector as defined by claim 1, wherein the plurality of detent hooks includes two detent hooks, which extend relative to one another with a spread.

11. The plug connector as defined by claim 1, wherein the retaining clip includes a support face configured such that, in a locked state of the plug body, the support face is supported on a periphery of the opening.

12. The plug connector as defined by claim 11, wherein the plug body includes a body support face configured such that, in the locked state of the plug body, the body support face is supported on the periphery of the opening.

13. The plug connector as defined by claim 11, wherein the support face is mounted on a circumference of the retaining clip and limits an insertion distance of the detent hooks into the recesses between the plug body and the ribs.

14. The plug connector as defined by claim 1, wherein vertically extending slotlike recesses are defined on the plug body on both sides of the at least one rib.

15. A method for assembling a plug connector having (i) a plug body configured to connect to an opening and including ribs formed on the plug body, and (ii) a retaining clip supported axially adjustably on the plug body and which includes a plurality of detent hooks, each of which has a contoured face end, the method comprising:
inserting the plug body with the adjustably received retaining clip in an open position in which the plurality of detent hooks are braced on the ribs;
inserting the ribs into the opening until the ribs lock at the undercut and contoured face ends of the plurality of detent hooks slide off from the at least one rib in a radially inward direction;
adjusting the plurality of detent hooks of the retaining clip, which are disposed at a spread, in corresponding recesses; and
creating an overlap between the ribs and the plurality of detent hooks of the retaining clip to secure the ribs in the assembly position.

* * * * *